United States Patent
Lesniak et al.

(10) Patent No.: US 7,251,321 B2
(45) Date of Patent: Jul. 31, 2007

(54) CRESCENDO TELEPHONE RINGER

(75) Inventors: Ronald S. Lesniak, Scotts Valley, CA (US); Spencer L. Hermanson, San Jose, CA (US); Maxim Bakaleynik, San Jose, CA (US); Mario E. Jauregui, Millbrae, CA (US)

(73) Assignee: Teledex LLC, San Jose, CA (US)

( * ) Notice: Subject to any disclaimer, the term of this patent is extended or adjusted under 35 U.S.C. 154(b) by 0 days.

(21) Appl. No.: 10/631,914

(22) Filed: Jul. 30, 2003

(65) Prior Publication Data

US 2005/0025306 A1 Feb. 3, 2005

(51) Int. Cl.
*H04M 1/00* (2006.01)

(52) U.S. Cl. .................. 379/373.02; 379/373.01; 379/413.01; 379/418

(58) Field of Classification Search ........... 379/373.01, 379/373.02, 413.01, 418
See application file for complete search history.

(56) References Cited

U.S. PATENT DOCUMENTS

| | | | | |
|---|---|---|---|---|
| 5,870,684 | A | * | 2/1999 | Hoashi et al. ............... 455/567 |
| 6,084,959 | A | * | 7/2000 | Yun ....................... 379/373.02 |
| 6,115,469 | A | * | 9/2000 | Dalal et al. .................. 379/418 |
| 6,661,890 | B1 | * | 12/2003 | Ellis ....................... 379/355.01 |

* cited by examiner

*Primary Examiner*—Jefferey Harold
(74) *Attorney, Agent, or Firm*—Thelen Reid Brown Raysman & Steiner LLP

(57) ABSTRACT

Crescendo telephone ringers and methods of providing a crescendo telephone ring signal. The crescendo telephone ringer provides a gradual increase in audible ringing volume as a sequence of incoming electrical ring signals is detected. According to one embodiment, upon receipt of an incoming call, a first audible ring signal corresponding to a first detected electrical ring signal is set to a minimum volume. Subsequent audible ring signals corresponding to subsequent detected electrical ring signals are set to increasing volume levels, and finally to a maximum ringer volume.

17 Claims, 2 Drawing Sheets

CRESCENDO TELEPHONE RINGER

FIELD OF THE INVENTION

The present invention relates to telephones. More particularly, the present invention relates to apparatus and methods for generating and providing a special type of audible ringing signal for a telephone.

BACKGROUND OF THE INVENTION

The hospitality industry, e.g. the hotel industry, offers a wake-up service to its guests. Typically this wake-up service is provided by ringing a bedside telephone at a predetermined time, to alarm the guest that it is time to wake up. Unfortunately, being awakened by a loud telephone ring can be quite startling and uncomfortable to the guest. Accordingly, there is a need for a better way of providing a wake-up service.

SUMMARY OF THE INVENTION

Crescendo telephone ringers and methods of providing a crescendo telephone ring signal are disclosed. The crescendo telephone ringer provides a gradual increase in audible ringing volume as a sequence of incoming electrical ring signals is detected. According to one embodiment, upon receipt of an incoming call, a first audible ring signal corresponding to a first detected electrical ring signal is set to a minimum volume. Subsequent audible ring signals corresponding to subsequent detected electrical ring signals are set to increasing volume levels. According to another aspect of the invention, on any incoming call, once the maximum ringing level is reached, any additional rings would remain at that maximum level. The number of steps or volume increases could vary. Further, the crescendo ringing could be a user option, meaning that a user could be provided with the ability to set the telephone ringer at a constant ringing level (e.g. off, low, medium or high) or to ring in the crescendo mode.

Other aspects of the inventions are described and claimed below, and a further understanding of the nature and advantages of the inventions may be realized by reference to the remaining portions of the specification and the attached drawings.

DETAILED DESCRIPTION

Embodiments of the present invention described herein are of a telephone having a crescendo telephone ringer apparatus and methods of generating and providing crescendo telephone ringing. Those of ordinary skill in the art will realize that the following detailed description of the present invention is illustrative only and is not intended to be in any way limiting. Other embodiments of the invention will readily suggest themselves to such skilled persons having the benefit of this disclosure. Reference will now be made in detail to implementations of the present invention as illustrated in the accompanying drawings. Unless otherwise indicated, the same reference indicators will be used throughout the drawings and the following detailed description to refer to the same or similar parts.

Figure 1:
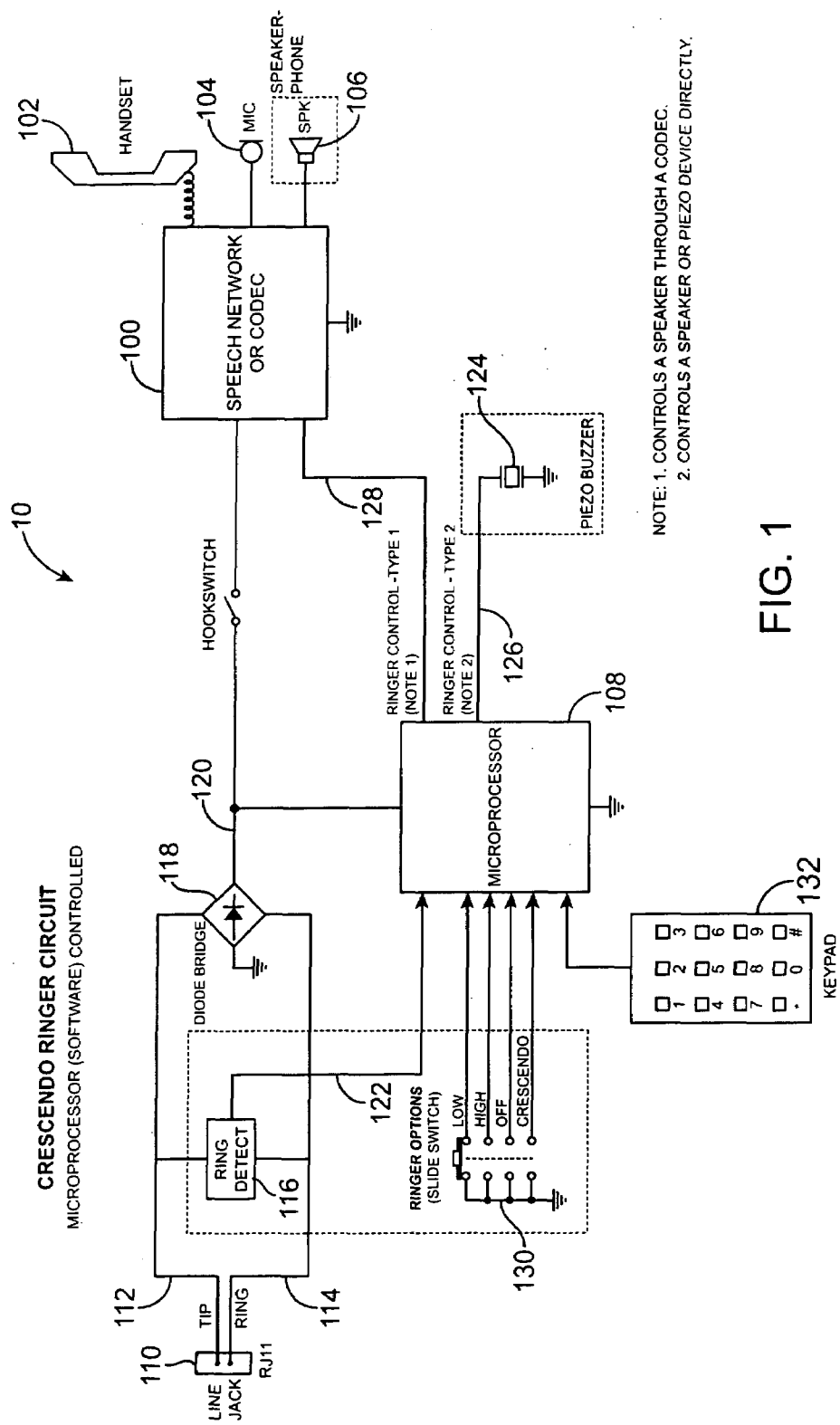
FIG. 1 is a diagram of a telephone ringing system, according to an embodiment of the present invention.

Referring to FIG. 1, there is shown a crescendo telephone ringing system 10, according to an embodiment of the present invention. As shown, system 10 may be integrated in a conventional telephone unit having speech network (or CODEC) 100, a handset 102, and a microphone 104 and speaker 106 for telephone units having speakerphone capabilities. System 10 is controlled by a microcontroller or microprocessor 108. (For purposes of this disclosure "microprocessor" and "microcontroller" will be used interchangeably, the understanding being that either can be used to perform the various operations described herein.) System 10 is designed so that it may be coupled to a telephone line jack (e.g. a conventional RJ11 jack) 110. Tip 112 and ring 114 lines of system 10 connect to jack 110. A ring detect circuit 116 is coupled between tip and ring lines 112 and 114. A diode bridge 118 is coupled between tip and ring lines 112 and 114 and is operable to provide polarity protection, i.e., operates to provide a diode bridge output signal (on line 120) that is of the same polarity regardless of the polarity of the input voltage polarity across the tip and ring lines 112 and 114. Ring detect circuit 116 is operable to detect a ring signal applied to tip and ring lines 112 and 114 and generate a ring detect signal. The ring detect signal is coupled to microprocessor 108, via a ring detect signal line 122. Incoming ring signals are monitored by microprocessor 108. An audible ringing signal is software controlled and produced through an audible ring signal generator (e.g. piezo-electric buzzer, speaker, or other suitable sound-producing device) 124 coupled to a ringer control line 126.

According to an alternative embodiment, speaker 106 generates the audible ringing signal. According to this alternative embodiment, an audible ringing signal is produced by speaker 106 by control of CODEC 100, which in turn is controlled by ringer control signals provided by microprocessor 108 over ringer control line 128. Whereas only a single control line 128 is shown as coupled to CODEC 100, those of ordinary skill in the art will readily understand that more than one control line (input or output of microprocessor 108) could be interconnected between microprocessor 108 and CODEC 100.

According to an embodiment of the invention, a gradual increase in audible ringing volume is provided, as the sequence of incoming call (i.e. ringing) signals are presented across tip and ring lines 112 and 114. According to this embodiment, on an incoming call, the first ring would be at a minimum volume and subsequent rings would have increasing volume levels. Eventually a maximum volume ringing level would be reached. According to an embodiment of the invention, once this maximum volume ringing level is reached, any additional rings would remain at that maximum volume ringing level.

According to an embodiment of the invention, crescendo ringing would be a user option, meaning that a user could direct system 10 to ring at a constant ringing level (e.g. off, low, medium or high) or to ring in the above-described crescendo mode. Providing a user with this capability may be accomplished by, for example, coupling a slide switch 130 having the various ringer options (i.e. off, low, medium, high and crescendo) to inputs of microprocessor 108. Those skilled in the art will readily appreciate that, whereas a slide switch is shown, other equivalent switching mechanisms may be used. Further, according to an alternative embodiment, a "menu" item from the telephone keypad 132 may be used, eliminating the need for the slide switch. According to this embodiment, the menu item may be selectable using a "menu" key, which when pressed provides the user select options on an LCD display.

Figure 2:
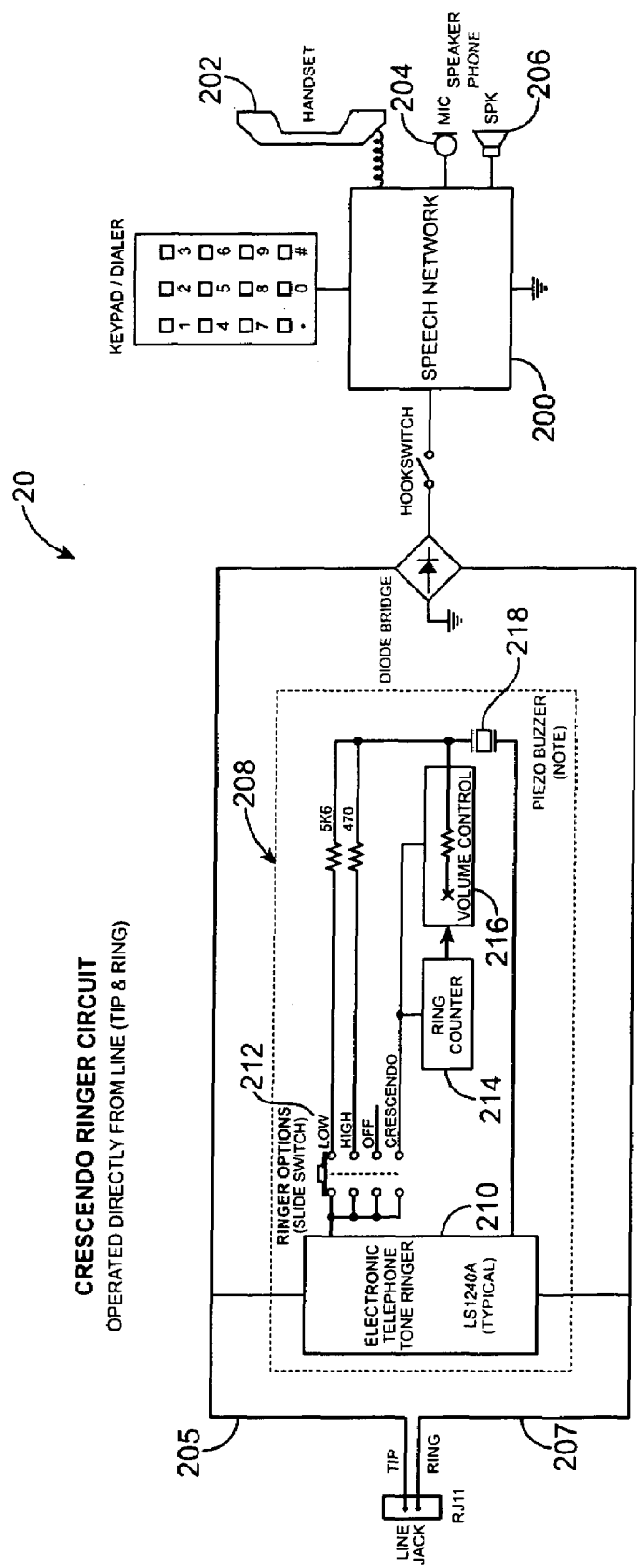
FIG. 2 is a diagram of a telephone ringing system, according to an alternative embodiment of the present invention.

Referring now to FIG. 2, there is shown a telephone ringing system 20, according to an embodiment of the present invention. As shown, system 20 may be integrated in a telephone unit having speech network 200, a handset 202, and a microphone 204 and speaker 206 for telephone units having speakerphone capabilities. System 20 includes a crescendo ringer circuit 208 that operates directly from tip and ring lines 205 and 207, and, unlike the embodiment shown in FIG. 1, does not require use of a microprocessor. Incoming ring signals directly drive an electronic telephone tone ringer 210, which may be, for example, an LS1240A tone ringer. A slide switch 212 (or other equivalent switching mechanism) provides a user with options of setting an audible ringing volume (e.g. off, low, medium, high) of a ring signal, and an option of selecting a gradual increase in audible ringing volume (i.e. crescendo option). When set at the crescendo setting, incoming ring tone signals from tone ringer 210 are counted by a ring counter 214. Ring counter 214 provides a control signal to a ringing volume control unit 216. For each successive ring count, ring counter 214 provides a corresponding control signal. In response to each corresponding control signal, ringing volume control unit 216 provides an associated output signal that is used to control the setting of an audible ring signal generator (e.g. a piezo-electric buzzer, speaker, or other suitable sound-producing device) 218. According to an embodiment of the invention, each successive ring count counted by ring counter 214 leads to a corresponding succession of audible ring signals, each ring in the succession having a somewhat higher volume than a preceding audible ring signal.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of this invention.

What is claimed is:

1. A telephone, comprising:
   an electronic telephone tone circuit, directly coupled to tip and ring telephone line, operable to detect electric ring signals on said tip and ring telephone line, said electric ring signals associated with a singular incoming telephone call, wherein a user-controlled ring-level option switch including a cresendo setting is coupled to said electronic telephone tone circuit;
   a ring counter circuitry, coupled to said electronic telephone tone circuit, configured to count ring tone signals provided by said electronic telephone tone circuit in response to said electric ring signals; and
   a volume control unit, coupled to said ring counter circuitry, configured to generate ringer control signals corresponding to the electric ring signals of the singular incoming telephone call, wherein the ringer control signals are capable of driving an audible ring signal generator without external power supply.

2. The telephone of claim 1, wherein at least one audible ring signal in the succession of audible ring signals has a volume that is higher than a volume of a preceding audible ring signal in the succession when a ringer option switch is set at a crescendo setting.

3. The telephone of claim 2 wherein the audible ring generator comprises a piezo-electric device, a speaker, or other suitable sound-producing device.

4. The telephone of claim 1, wherein said audible ring generator is configured to provide a succession of audible ring signals, a first audible ring signal of the succession having a minimum volume and subsequent audible ring signals of the succession having increasing volume levels.

5. The telephone of claim 1, further comprising:
   a displayable menu system, coupled to said volume control unit, having a menu key, which when activated provides a user with one or more ringer options, including a crescendo ringing option.

6. A telephone ringer apparatus, comprising:
   an electronic telephone tone ringer configured to be coupled between tip and ring terminals of a telephone;
   a user-controlled ring-mode option switch coupled to said tone ringer having audible ring signal volume settings and a crescendo setting;
   an audible ring signal volume controller coupled to said ringer option switch; and
   an audible ring generating device, operable to generate a succession of audible ring signals characterized by a gradually increasing volume, said succession of audible ring signals corresponding to a succession of electrical ring signals of a singular incoming call received on the tip and ring terminals of said telephone, wherein the telephone ringer apparatus is configured to operate within a power range supported by the tip and ring terminals of said telephone.

7. The telephone ringer apparatus of claim 6, further comprising a ring counter coupled to said audible ring signal volume control operable to count the number of ring signals associated with an incoming telephone call.

8. A telephone, comprising:
   an electronic telephone tone ringer coupled between tip and ring terminals of the telephone;
   a user-controlled ring-mode option switch coupled to said electronic telephone tone ringer having audible ring signal volume settings and a crescendo setting;
   an audible ring signal volume controller coupled to said ringer option switch, configured to control volume of tone ringer; and
   an audible ring generating device coupled to the audible ring signal volume controller, wherein the telephone is configured to operate within a power range supported by the tip and ring terminals of said telephone.

9. A method of providing a telephone ringing signal, comprising:
   selecting a gradual increase in audible ringing volume in response to a selection of a crescendo option from a user-controlled ring-mode option switch;
   detecting a sequence of telephone electrical ring signals from a telephone line, said sequence of telephone electrical ring signals associated with a singular incoming telephone call;
   generating a sequence of ringer control signals from said sequence of electrical ring signals; and
   drawing power from the telephone line to generate a sequence of audible ring signals using said sequence of ringer control signals, at least one audible ring signal of said sequence of audible ring signals having a volume that is greater than a preceding audible ring signal of said sequence of audible ring signals.

10. A method of providing a telephone ringing signal, comprising:

detecting a sequence of electrical ring signals arriving on a telephone line, said sequence of electrical ring signals associated with a singular incoming telephone call;

determining whether a user-controlled ring-mode option switch is set to a crescendo setting; and drawing power from the telephone line to generate a sequence of audible ring signals corresponding to the detected sequence of electrical ring signals, a first of said sequence of audible ring signals having a first volume and one or more subsequent audible ring signals having a volume that is greater than the first volume.

11. The method of claim 10, further comprising counting the number of detected electrical ring signals as the sequence of electrical signals arrives.

12. The method of claim 11, further comprising generating a volume control signal for each detected electrical ring signal, each volume control signal having a value dependent upon the count number associated with the detected electrical ring signal.

13. An apparatus for providing a telephone ringing signal, comprising:

means for selecting a gradual increase in audible ringing in response to a selection of a crescendo option from a user-controlled ring-mode option switch;

means for detecting a sequence of telephone electrical ring signals from a telephone line, said sequence of telephone electrical ring signals associated with a singular incoming telephone call;

means for generating a sequence of ringer control signals from said sequence of electrical ring signals; and means for drawing power from the telephone line to generate a sequence of audible ring signals using said sequence of ringer control signals, at least one audible ring signal of said sequence of audible ring signals having a volume that is greater than a preceding audible ring signal of said sequence of audible ring signals.

14. The apparatus of claim 13, further comprising means for counting the number of detected electrical ring signals as the sequence of electrical signals arrives.

15. An apparatus for providing a telephone ringing signal, comprising:

means for detecting a sequence of electrical ring signals arriving on a telephone line, said sequence of electrical ring signals associated with a singular incoming telephone call;

means for determining whether a a user-controlled ring-mode option switch is set to a crescendo setting; and means for drawing power from the telephone line to generate a sequence of audible ring signals corresponding to the detected sequence of electrical ring signals, a first of said sequence of audible ring signals having a first volume and one or more subsequent audible ring signals having a volume that is greater than the first volume.

16. The apparatus of claim 15, further comprising means for generating a volume control signal for each detected electrical ring signal, each volume control signal having a value dependent upon a count number associated with the detected electrical ring signal.

17. A method of gently waking a sleeping person using a telephone, comprising:

selecting a gradual increase in audible ringing volume in response to a selection of a crescendo option from a user-controlled ring-mode option switch;

receiving a first electrical ring signal across tip and ring terminals of a telephone;

drawing power from the tip and ring terminals of a telephone to generate a first audible signal from the first electrical ring signal;

receiving a second ring signal across the tip and ring terminals of the telephone; and generating a second audible signal from the second electrical ring signal, said second audible signal having a higher volume than the first audible signal;

wherein both the first and second ring signals are associated with a singular incoming telephone call.

* * * * *